D. R. WARFIELD.
Corn Planter.
No. 56,839.   Patented July 31, 1866.
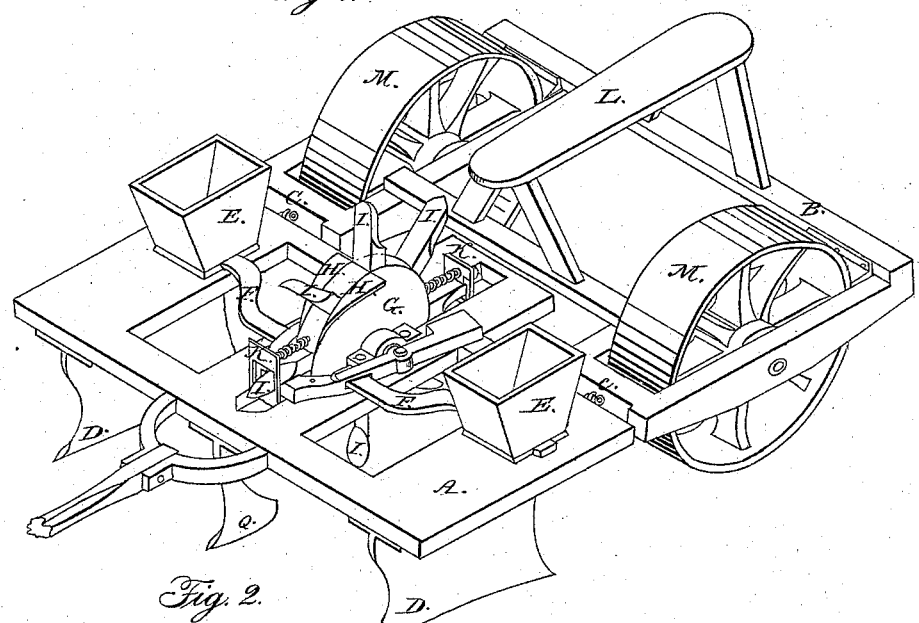
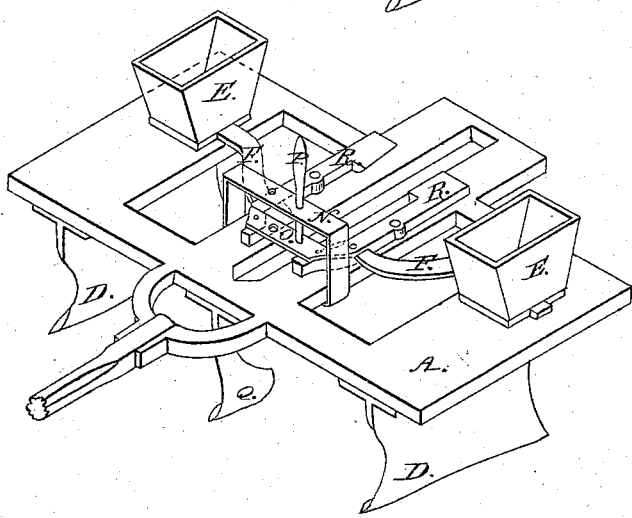
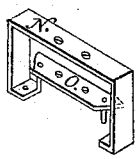
Witnesses:
G. Humphries
L. Murphy
Inventor:
David R. Warfield
by
D. P. Holloway & Co
his attys

UNITED STATES PATENT OFFICE.

DAVID R. WARFIELD, OF MUSCATINE, IOWA.

IMPROVEMENT IN CORN-PLANTERS.

Specification forming part of Letters Patent No. 56,839, dated July 31, 1866.

*To all whom it may concern:*

Be it known that I, DAVID R. WARFIELD, of Muscatine, in the county of Muscatine and State of Iowa, have invented a new and useful Improvement in Corn-Planting Machines, whereby corn may be planted in check-rows without marking or furrowing out; and I do hereby declare that the following is a full, true, and exact description of the same, reference being had to the accompanying drawings, made part of this specification, in which—

Figure 1 is an isometrical projection, showing the machine when arranged to work automatically; and Fig. 2 is a similar projection of the fore part of the same, when arranged to work by hand. Fig. 3 is a perspective view of the standards for supporting the lever when worked by hand when disconnected.

The machine is formed in two parts, A and B, attached together by the hooks and swivel-joints C, so connected as that the frame will work together by a joint operating vertically, but rigid, or nearly so, horizontally.

On the front frame are fixed the two furrowing-plows D D and the track-clearer Q. This track-clearer is intended to remove any obstructions in the ground, and leave a smooth surface upon which the wheel G may operate by means of its spurs I I.

The wheel G has eight or more projecting spurs of suitable width and of length sufficient to enable them to penetrate the ground to the depth of an inch or more. On the sides of the wheel G, at its periphery, are attached the cams H H, forming inclined planes, as shown.

On the two spurs, which are at opposite sides of the wheel and each at ninety degrees from the bases of the cams H, are placed the plates K K. The spurs pass through slots in these plates, and the plates are kept in position by means of spiral springs, which will yield whenever the plate strikes upon a stone or other hard substance. These plates will press upon the ground and make marks precisely opposite the places where seeds of corn are dropped.

The cams H H actuate two levers, R R, on either side, hinged at the middle, and so shaped as that the cams H H will at each revolution of the wheel G press alternately against each end of said levers, thus communicating a vibratory motion to the arms F F, working into the base of the seed-boxes E E, and dropping two or more grains at each revolution of the wheel in the usual mode, the grain dropping through the heel of the plow D D and being covered by the rollers M M.

The driver rides upon the longitudinal seat L, resting upon the frame B. He can, by his position on the seat, regulate the action of the wheel G. Should he see by the indentations in the ground that the machine is not dropping the seeds in check-rows that can be cultivated either way, by throwing himself back on the seat the front of the frame B will be raised, elevating with it the rear part of the frame A, to which it is united at C, as set forth, thus raising the spurs of the wheel G out of the ground, and thus stopping the motion of the arms F F, when the machine will drop correctly. By moving forward he renews the action of the wheel G.

Should it be, for any reason, desirable to work the seed-droppers by hand instead of automatically, the wheel G may be removed and the lever R actuated by hand by means of a lever working through the support N and tie O, which are placed on the frame for that purpose, in the manner shown.

Having thus fully explained the nature and mode of operating with my improvements, what I claim as my invention, and seek to secure by Letters Patent, is—

1. Constructing the driving-wheel G with spurs I, when used in combination with the cams H H and levers R R, for actuating the sliding seed-valves of a corn-planter, substantially as set forth.

2. In combination with the spurs I, the plates K, arranged substantially as and for the purposes set forth.

3. The combination of the wheel G and spurs I and frame A with the frame B and seat L, substantially as and for the purposes set forth.

4. In combination with the wheel G and spurs I, the track-clearer Q, substantially as and for the purposes set forth.

5. The levers R R, in combination with the supports N and lever P, substantially as and for the purposes set forth.

In testimony whereof I have signed my name to this specification in the presence of two subscribing witnesses.

DAVID R. WARFIELD.

Witnesses:
L. H. WASHBURN,
JOHN BEARD.